United States Patent [19]

Grimminger et al.

[11] 4,302,143

[45] Nov. 24, 1981

[54] DEVICE FOR FILLING A CONTAINER WHICH IS UNDER PRESSURE

[75] Inventors: Albert Grimminger, Leonberg; Werner Wiedmann, Stuttgart, both of Fed. Rep. of Germany

[73] Assignee: Werner & Pfleiderer, Stuttgart-Feuerbach, Fed. Rep. of Germany

[21] Appl. No.: 92,736

[22] Filed: Nov. 9, 1979

[30] Foreign Application Priority Data

Dec. 29, 1978 [DE] Fed. Rep. of Germany ....... 2856617

[51] Int. Cl.³ .............................................. C10J 3/30
[52] U.S. Cl. .................................. 414/173; 48/86 R; 414/187; 414/198
[58] Field of Search ............... 414/217, 218, 221, 172, 414/173, 181, 187, 198, 202; 48/86 R; 141/81, 392

[56] References Cited

U.S. PATENT DOCUMENTS 3,152,703 10/1964 Slagely ................................ 414/202
4,009,788 3/1977 Waldhofer ......................... 414/187

Primary Examiner—Robert G. Sheridan
Attorney, Agent, or Firm—Hane, Roberts, Spiecens & Cohen

[57] ABSTRACT

Apparatus for charging solids into a pressurized container having a tubular lock chamber thereon. The apparatus comprises a feed device for supplying solids to the inlet of the lock chamber and a housing mounted adjacent the lock chamber for movement towards and away therefrom; a displacer member is slidably mounted in the housing in axial alignment with the inlet of the lock chamber; a first seal is provided in the housing for sealingly engaging the displacer member, and a second seal is provided on one of the opposed surfaces of the lock chamber and housing. The first seal is axially located along the displacer member at a distance from the end of the housing which exceeds the stroke of the displacer member in its travel between its extended and retracted positions whereby the portion of the displacer member which penetrates into the lock chamber will not come into contact with the first seal.

10 Claims, 5 Drawing Figures

DEVICE FOR FILLING A CONTAINER WHICH IS UNDER PRESSURE

FIELD OF THE INVENTION

The present invention relates to improvements in a device for filling a container which is under pressure, particularly for charging solids such as small lump coal into a pressure gasifier.

PRIOR ART

A device of the above type is known in which a tubular lock chamber is mounted on the container and is provided with an outlet opening closable by a valve and an inlet opening into which an axially displaceable member extends. The chamber is provided with a seal for the axially displaceable member.

Such filling devices, which are also known as lock systems with a displacer means, are used particularly in the pressure gasification of dry coal to minimize gas losses as far as possible in contradistinction to lock devices which operate only by placing the gas product under pressure and releasing the pressure. This is achieved by the displacer means which pushes the gas which has entered the lock system back into the pressure container.

West German Pat. No. 843,090 discloses the use of a piston-like displacer having an end entering into the tubular lock chamber and provided with a seal which prevents the emergence of gas. The seal consists of piston rings which cooperate with surfaces of the lock chamber which are continuously acted upon by the material being charged and are therefore subjected to very extensive wear. At the pressures under consideration, which are of the order of magnitude of 100 bar and more, the seal therefore will become ineffective very quickly, frequently leading to interruptions in operation in order to carry out repair work.

In another known lock of the above-mentioned type, a roll packing is provided as a seal between the displacer and the lock chamber (West German Unexamined application for patent No. 21 53 188). Such seals can be used only at relatively low pressures. Furthermore, the seals are subjected, at least for a time, to the action of the solids which are introduced and therefore undergo intense wear. Another disadvantage of the known lock is that a slide is used as a shut-off member between the supply hopper and the lock chamber, and the sealing surfaces of said slide are continuously acted on by solids and therefore become rapidly worn.

SUMMARY OF THE INVENTION

An object of the present invention is to provide an improved charging device in which the seals operate practically without wear and therefore whose operating life is considerably increased as compared with the known devices.

The above and further objects of the invention are achieved by a construction comprising a housing mounted adjacent the lock chamber for movement towards and away therefrom, a displacer member slidably mounted in the housing in axial alignment with the inlet of the lock chamber, first seal means in the housing sealingly engaging the displacer member and second seal means in one of the surfaces of the lock chamber and housing which contact one another when the housing has been moved to an operative position in which the displacer member is extendible to force solids in the lock chamber into the container. The first seal means is axially located at a distance from the surface of the housing which contacts the opposed surface of the lock chamber and this distance exceeds the stroke of the displacer member in its travel between its extended and retracted positions.

By the spaced separation of the seal means, in accordance with the invention, the sealing of the displacer member is separated from the sealing of the housing and lock member and the seal for the displacer member is entirely relieved from the action of the material being charged. The seal can be provided in fixed position in the housing, as a result of which the structural expense is considerably reduced. In this respect there can be provided means for flushing the seal with a sealing liquid both for increasing the sealing effect and the operating life. Since the material being charged is fed at atmospheric pressure, there are no sealing points acted on by the material in the feed device.

In accordance with a feature of the invention, the housing is mounted on a frame connected to the lock chamber for axial displacement towards and away from the lock chamber. By this construction, a simple and compact apparatus is produced. Furthermore, with this arrangement, no transversely developed displacement movements between the lock chamber and the housing is possible so that the seals between these members are only subjected to compression and, thus, are substantially without wear in practice.

According to a further feature of the invention, the seal which acts between the housing and the lock member comprises a hollow member containing an elastic body having a cavity and adapted for being pressurized. This provides a very effective but substantially wear-free seal. Furthermore, the pressure fluid which places the seal under pressure can also assume the function of a cooling fluid, if necessary.

BRIEF DESCRIPTION OF THE SEVERAL VIEWS OF THE DRAWING

One embodiment of the invention will be described with reference to the drawings, in which.

DETAILED DESCRIPTION

Figure 1:
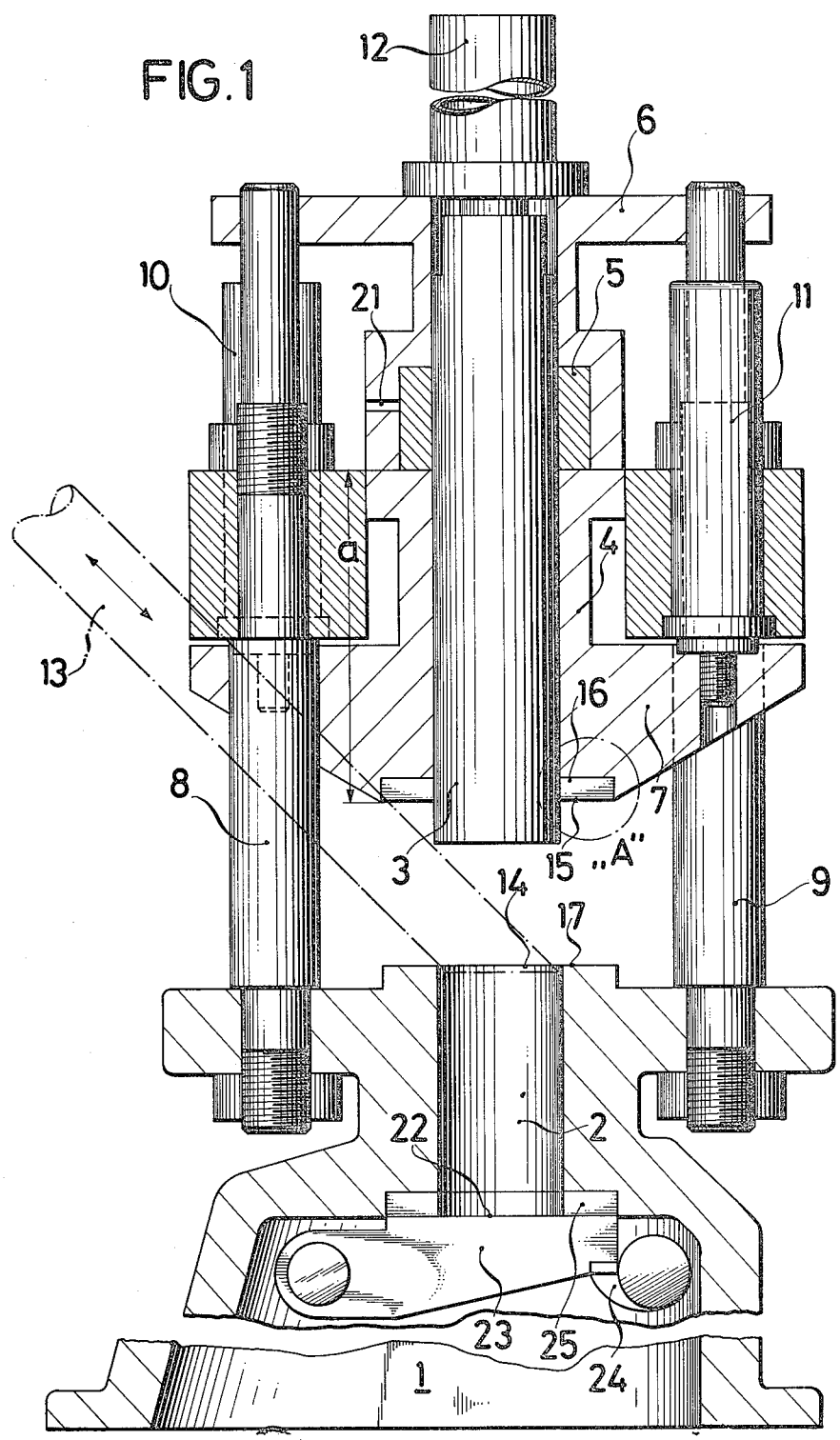
FIG. 1 is a vertical longitudinal section through the charging device.

The invention is directed to a charging device adapted for feeding material to a container 1 which is under high pressure. The charging device essentially comprises a tubular lock chamber 2 which is mounted on the container 1 and a piston-like displacer 3 which is adapted to project axially into the chamber 2 to force material fed thereto into the container. The displacer 3 is slidably mounted in a cylindrical housing 4 within which is a seal 5 which surrounds the displacer in sealing relation. The housing 4 is movable towards and away from the lock chamber 2 and is guidably supported by means of cross members 6 and 7 provided at its ends mounted on a frame consisting of two vertical columns 8 and 9. The columns 8, 9 are connected to the lock chamber 2 and on the columns are arranged hydraulic cylinders 10 and 11 which act on the lower cross member 7 to produce axial displacement of the housing 4. Another hydraulic cylinder 12 is arranged on the upper cross member 6 to effect the displacement of the displacer 3 within the housing 4.

Figures 3, 4, 5:
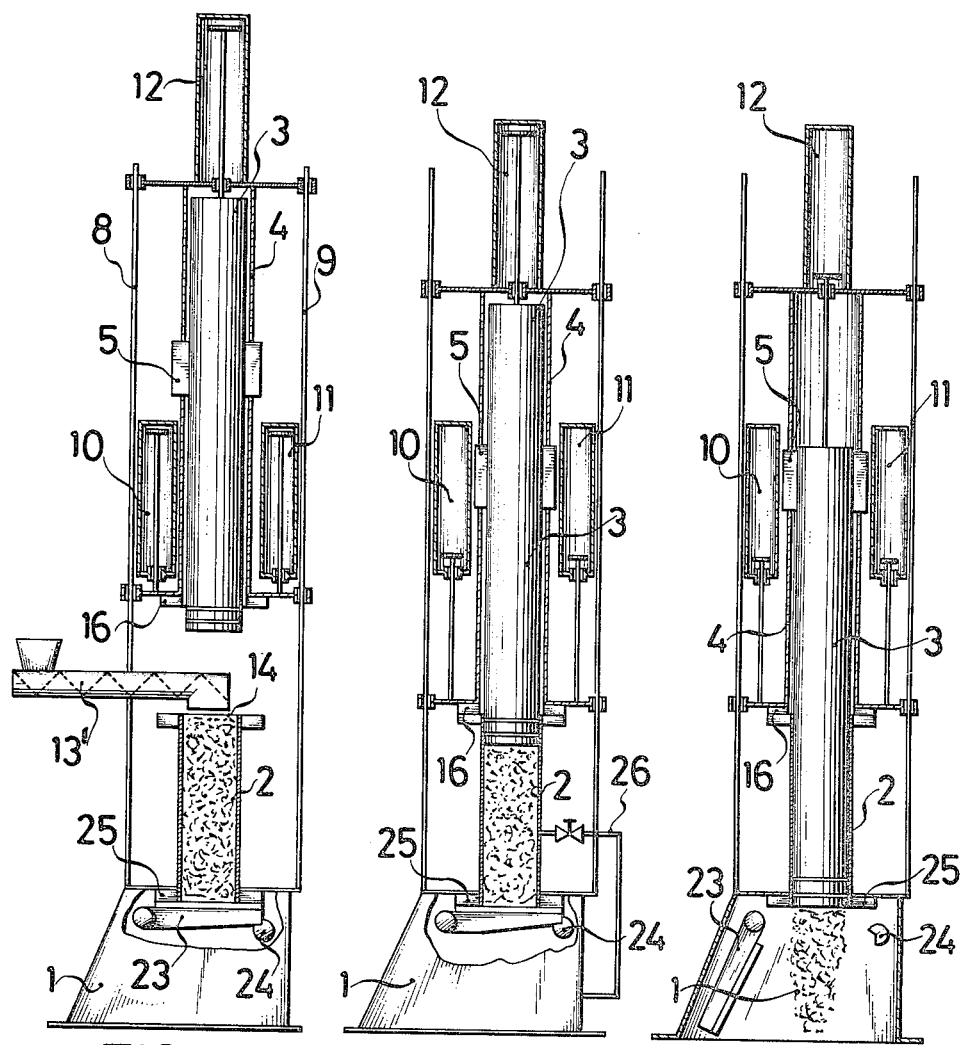
FIGS. 3 to 5 show the apparatus of FIG. 1 in different operating positions, in simplified manner.

The feed of the charge material into the lock chamber 2 is effected by means of a feed device 13 which comprises a tube which is displaceable obliquely from above into the filling opening 14 of the lock chamber 2 (FIG. 1). The feed device can also be constructed as shown at 13' as a worm conveyor which is swingable horizontally over the filling opening 14 (FIG. 3). The feed device 13' can be placed, in each case, in alternation with the housing 4, on the filling opening 14.

Figure 2:
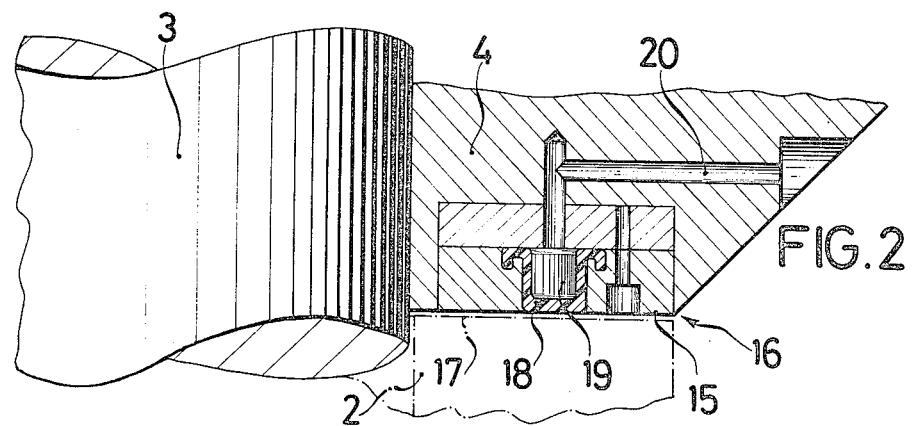
FIG. 2 shows detail A of FIG. 1 on a larger scale.

At the lower end 15 of the housing 4 there is provided a seal 16, shown in greater detail in FIG. 2, which upon placement of the housing 4 on the lock chamber 2 comes into contact with the upper face 17 of the chamber 2. Of course, the arrangement could also be the reverse hereof, in which case the seal 16 would be on the upper face 17 and would cooperate with the lower end 15.

From FIG. 2 it can be seen that the seal 16 comprises a hollow ring 17 and a sealing body 18 of elastic material mounted in the ring 17. The body 18 has a cavity 19 which can be placed under pressure by a pressure fluid via a conduit 20. The outside of the sealing body 18 is flat and continuous and bounds cavity 19 so that when the housing 4 is placed on the lock chamber 2, a relatively wide contact zone is produced in which any dust-like particles of the charge material are surrounded by the elastic material of the sealing body 18 without the sealing effect being impaired thereby. The pressure fluid intended for placing the seal 16 under pressure can be used at the same time for the cooling of the sealing surfaces, whereby the seal can be used even at higher temperatures.

The seal 5 for the displacer 3 is provided in the housing 4 at a distance a from the lower end 15 of the housing which distance is at least as large as the stroke of the displacer 3. As a result of this arrangement any charge material which might adhere to the displacer can not pass into the region of the seal 5. The seal 5 is flushed by a sealing liquid (for instance, water or oil) which is fed via a bore 21 in the housing 4.

The outlet opening 22 of the lock chamber 2 is in communication with the container 1 and can be selectively opened and closed by a flap 23 which is swingable about a horizontal axis. In the closed position shown in FIG. 1 the flap 23 is secured by a turnable bolt 24. On the outlet side of the lock chamber 2 there is a seal 25 which corresponds in construction and manner of operation to the seal 16 shown in FIG. 2. In order to keep the thermal load on the seal 25 as low as possible, an additional cooling circuit can be provided in the flap 23 in the region of the sealing surfaces.

The operation of the charging device is shown in FIGS. 3 to 5. After the filling of the lock chamber 2, the feed device 13 is moved away from filling opening 14 and the housing 4 placed on the lock chamber 2, the displacer 3 penetrating into the chamber 2. Shortly before the ends of the housing 4 and lock chamber 2 contact each other, any particles of the charge material which may have come between them are removed by a blast device (not shown). By the pressure exerted by the hydraulic cylinders 10, 11 the housing 4 tightly contacts the lock chamber 2. At the same time, the seal 16 is placed under pressure. If necessary, equalization of pressure can be brought about via a connecting line 26 between the container 1 and the lock chamber 2. Then the outlet opening 22 of the lock chamber 2 is opened by swinging the flap 23 into the position shown in FIG. 5. The charge material falls into the container 1. Any adherent material in the lock chamber 2 is removed by further downward movement of the displacer 3 produced by the hydraulic cylinder 12. When the displacer 3 has reached its end position (FIG. 5), the flap 23 is closed and locked and the seal 25 placed under pressure. Then the displacer 3 is moved upward and, if necessary, the pressure still present in the lock chamber 2 is relieved via a connection (not shown) to the ambient atmosphere. The loss of gas in this connection is minimum. Finally, the seal 16 is relieved of pressure and the housing 4 moved to its upper position, whereupon, after placement of the feed device 13 on the inlet opening 14, the next charging cycle commences.

What is claimed is:

1. Apparatus for charging solids into a pressurized container comprising a tubular lock chamber on the container, said lock chamber having an inlet for receiving solids to be supplied to the container and an outlet for supplying the solids to the container, valve means at the outlet of said lock chamber, feed means for supplying solids to said inlet of the lock chamber, a housing mounted adjacent said lock chamber for movement towards and away therefrom, a displacer member slidably mounted in said housing in axial alignment with said inlet of the lock chamber, first seal means in said housing sealingly engaging said displacer member, said lock chamber and said housing having opposed respective surfaces which contact one another when the housing has been moved to an operative position in which the displacer member is extendable to force solids in said lock chamber into said container with said valve means open, second seal means on one of said opposed surfaces for sealing said surfaces, said displacer member having a retracted position within said housing when extracted from said lock chamber, said first seal means being axially located along said displacer means at a distance from the surface of the housing which contacts the opposed surface of the lock chamber, said distance exceeding the stroke of the displacer member in its travel between its extended and retracted positions whereby the portion of the displacer member which penetrates into the lock chamber will not come into contact with the first seal means.

2. Apparatus as claimed in claim 1 wherein said feed means is selectively movable between an operative position adjacent the inlet of the lock chamber and an inoperative position retracted from the inlet of the lock chamber.

3. Apparatus as claimed in claim 1 wherein said valve means comprises a pivotably movable flap member.

4. Apparatus as claimed in claim 1 comprising a frame secured to said lock chamber guidably supporting said housing for longitudinal movement towards and away from said lock chamber.

5. Apparatus as claimed in claim 4 wherein said housing is mounted on said frame above said lock chamber.

6. Apparatus as claimed in claim 4 wherein said second seal means comprises a hollow elastic body having a cavity and means for pressurizing said cavity to expand said body.

7. Apparatus as claimed in claim 6 wherein said second seal means further comprises a hollow ring in which said elastic body is engaged.

8. Apparatus as claimed in claim 6 wherein said elastic body has a flat, continuous face which faces the surface opposite the seal means and bounds said cavity.

9. Apparatus as claimed in claim 1 wherein said displacer member is positioned in said housing in said retracted position to penetrate into said lock chamber when the housing comes into contact with lock chamber.

10. Apparatus as claimed in claim 1 comprising means for flushing said first seal means with a sealing fluid.

* * * * *